Dec. 4, 1951  C. E. HUTCHISON ET AL  2,577,464
RELEASABLE ARTICLE CARRIER
Filed May 6, 1950
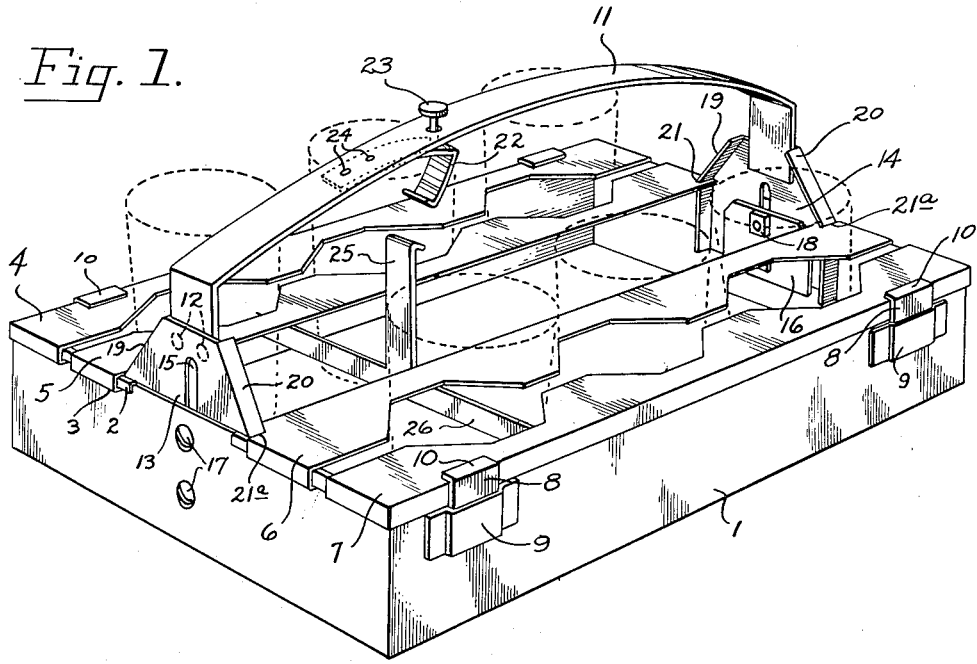
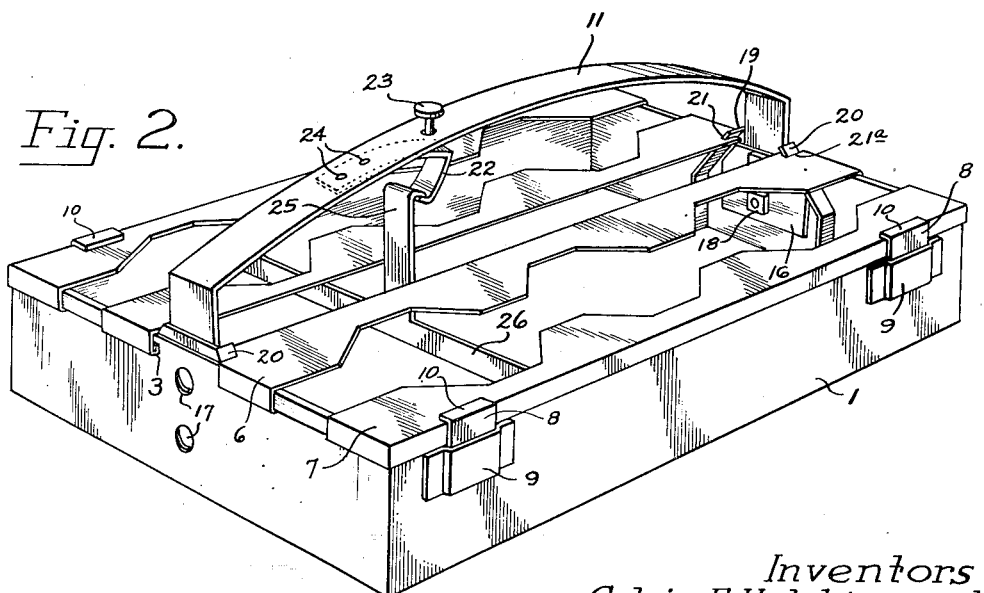
Inventors
Calvin E. Hutchison and
William F. Spivey, Jr.

Patented Dec. 4, 1951

2,577,464

UNITED STATES PATENT OFFICE 2,577,464

RELEASABLE ARTICLE CARRIER

Calvin E. Hutchison and William F. Spivey, Jr., Seaside, Oreg.

Application May 6, 1950, Serial No. 160,558

10 Claims. (Cl. 294—87.24)

This invention relates to a portable carrier for such articles as drinking glasses or bottles and contemplates, as one object thereof, the provision of an efficient means to grip, carry, and release a multiplicity of such articles.

Another object of our invention is to provide a portable article carrier which utilizes movable cam actuated jaws for sequentially gripping a number of articles therebetween, carrying the articles to a point of use such as a table, and releasing the articles whereupon the carrier may be removed, leaving the articles on the table.

It is customary for waiters in restaurants, night clubs, hotels, and beer taverns to carry large numbers of filled or empty drinking glasses on trays. It is common knowledge that this practice results in a high drinking glass mortality rate since the glasses often slide about or slip from the trap and are broken. The owners of establishments which thus handle large numbers of drinking glasses usually account for the breakage cost by charging the same to the cost of doing business. In line with this accounting practice, one object of this invention is directed toward a reduced cost of doing business by lowering the glass breakage. Thus, the invention provides a portable carrier especially designed for drinking glasses which carrier will safely and dexteriously pick up and transport a large number of drinking glasses. Our invention further comprehends the provision of a multiple drinking glass carrier which is quick and positive in operation so that waiters may efficiently handle large numbers of drinking glasses with a minimum of thought, skill, and attention. One advantage thereby inherent in the use of our carrier is that a relatively less skilled class of employees may safely serve large numbers of drinks and a dual reduction in the cost of doing business will thereby be effected.

One of the objects of our invention is to provide a portable drinking glass carrier which may be placed upon a loading counter or bar, which will safely and surely grip a large number of drinking glasses, and which will release the said drinking glasses at a point of use by the manipulation of a movable handle conveniently located thereon.

A further object of our invention is to provide the handle of a portable drinking glass carrier with a cam actuation means for the glass gripping jaws thereof and with a releasable latch means for holding the said jaws thereof apart so that the carrier can be lifted out of gripping relationship with the drinking glasses after the said glasses are deposited on a table.

Still further, another object of our invention is to provide a portable drinking glass carrier with detachable glass gripping jaws whereby various sized jaws may be interchanged to conform to various sized drinking glasses to be carried.

These and other objects and advantages of our invention will be described with reference to the accompanying drawing, wherein:

Fig. 1 is a perspective view of the portable drinking glass carrier of our invention in glass gripping position and showing, in dashed outline, six drinking glasses held in place by the coaction of the fixed and slidable jaws of the carrier; and Fig. 2 is a perspective view, similar to Fig. 1, showing the portable drinking glass carrier of our invention in released position with the handle thereof latched in place so that the jaws are held apart to release the drinking glasses from the carrier.

In the illustrated embodiment of our invention, a peripheral main frame 1 is shown with a pair of spaced guide channels 2 formed along the marginal edge of one end thereof. A pair of similar channels (not shown) are formed along the opposite end of said frame. These guide channels 2 cooperate with slotted riders 3 formed integral with the ends of each of the four slidable and fixed jaw members 4, 5, 6, and 7. The two marginal jaw members 4 and 7 are releasably secured to the frame 1 by means of lipped fasteners 8. We prefer to secure these lipped fasteners 8 to the main frame 1 with friction grippers 9 which are, in turn, brazed, welded, or screwed to the main frame. The lipped fasteners 8 are formed with a lip portion 10 overlying the top of the two marginal or fixed jaw members 4 and 7 to releasably secure the same in place. That is to say, during the operation of our portable article carrier, the two marginal jaw members 4 and 7 are fixed in place by the lipped fasteners but, if a different sized glass or bottle is to be accommodated therebetween, the lipped fasteners 8 may be removed from the friction grippers 9 and a different set of four jaw members having different sized recesses therein may be slidably moved into place over the guide channels 2.

The actuation and carrying means for our invention comprises a movable convex handle 11 which is secured, as by rivets 12, to identical companion cam members 13 and 14 located at each end of the peripheral main frame. The cam members 13 and 14 and the movable handle 11 are vertically slidable, as an integral unit, with respect to the main frame 1. This vertical movement is made possible by forming a pair of slotted guide ways 15 in the cam members 13 and 14 and by securing a pair of brackets 16 to the main frame by means of two guide bolts 17 held by companion nuts 18. Each of the cam members 13 and 14 has two dual faced cam surfaces 19 and 20. These cam surfaces 19 and 20 ride in cam follower slots 21 and 21a formed through the inner slidable jaw members 5 and 6 respectively. Thus, when the cam members 13 and 14 are in the raised position of Fig. 1, the slidable jaw members 5 and 6 are in gripping position adjacent the fixed jaw members 4 and 7 and, when the cam members 13 and 14 are in the down position of Fig. 2, the slidable jaw members 5 and 6 are in released position with respect to the fixed jaw members 4 and 7. The movement from gripping to released position or vice versa is caused by the coaction of the cam surfaces 19 and 20 and the cam follower slots 21 and 21a in an obvious manner.

Our invention further provides a releasable latch means for holding the slidable jaw members thereof in the released position of Fig. 2. Thus, as therein shown, the handle 11 carries a bent latch member 22 and an associated plunger and button 23. The plunger 23 is secured to the top of the latch member 22 as by welding or screw thread engagement and the latch member 22, in turn, is secured to the under side of the convex movable handle 11 either by welding or by rivets such as are shown at 24. A lipped holding member 25 is vertically disposed adjacent the latch member 22 for cooperation therewith and is mounted on a cross frame member 26 which frame member, in turn, is secured to opposite marginal edges of the peripheral main frame 1. At this point, it should be noted that the movable handle 11 is formed with a substantial convex arch thereto and that the top portion of the bent latch member 22, which is made of an elastic material such as spring steel, somewhat follows this convex arch. That is to say, the portion of the bent latch member 22 which is secured to the handle 11 by the rivets 24 is in a lower horizontal plane than the portion of the bent latch member 22 which is secured to the end of the plunger 23. Thus, when the plunger 23 is pushed down in its cooperative circular opening in the handle 11, the lower bent portion of the latch member 22 moves away from the lipped member 25 at the same time it moves vertically downward. This convex handle and latch member construction is deemed expedient, not only to insure a positive release of the latch member 22 from the holding member 25, but also to dispose the handle 11 and plunger 23 above the plane of the top of the drinking glasses (see Fig. 1) so that the hand of a waiter operating our portable drinking glass carrier will not come into contact with the drinking glasses at rest therein.

In the construction and use of our portable drinking glass carrier, a suitable set of jaw members 4, 5, 6, and 7 are first selected. Thus, while we have shown our portable carrier with a particular size of drinking glass therein, such a showing is illustrative only and is not meant to limit the scope of our invention since, obviously, the interchangeable jaw members of our carrier are equally well adapted for carrying diverse sizes the shapes of glasses, bottles, cans, paper cartons, and other articles. The releasable lipped fasteners 8 allow an easy interchange between different sized jaw members designed to grip a diversity of objects. Once the proper size set of jaw members has been secured in place on our portable carrier, a waiter, making use of our carrier, will place the same on a loading counter or bar and depress the movable handle 11. As the handle 11 is depressed, the cam members 13 and 14 ride in the cam follower slots 21 and 21a to cause the two slidable jaw members 5 and 6 to move away from their complementary fixed jaw members 4 and 7 respectively. At the same time, the spring-like bent latch member 22 cams over the surface of the lipped holding member 25 and engages therewith so that the entire portable carrier structure assumes the position shown in Fig. 2. A number of filled drinking glasses are then placed in position between the recessed portions of the jaws and the portable carrier is ready for operation. While we have shown the preferred form of our invention as embodying six pairs of complementary recesses to accommodate six glasses, it is obvious that the scope of our invention comprehends the use of any reasonable number of pairs. That is to say, the number of drinking glasses which our portable carrier will handle is not a critical factor.

To carry the loaded portable carrier to a point of use such as a table or booth, the waiter depresses the plunger 23 while, at the same time, he lifts on the movable handle 11. The depression of the plunger 23 swings the bent latch member 22 out of engagement with the lipped holding member 25 and the raising of the handle 11 cams the two slidable jaw members 5 and 6 into gripping relationship with the filled glasses. Thus, as the dual cam surfaces 19 and 20 are raised upwardly, the cam follower slots 21 and 21a slide the jaw members 5 and 6 horizontally along the guide channels 2 toward the fixed jaw members 4 and 7 respectively so that the entire portable carrier structure assumes the position shown in Fig. 1. The jaw members now grip the periphery of the glasses or bottles placed therebetween and the portable carrier may be moved about to any desired point of use. At the point of use, any number or all of the drinking glasses may be released as desired. Thus, if but one drinking glass is required at the first point of use, the waiter merely lifts one of the drinking glasses from the carrier. The removal of a single drinking glass is made practical by the fact that the recess portions of the jaw members grip only the periphery of the drinking glasses. If, on the other hand, the waiter wishes to deposit all the drinking glasses on a single table, he merely sets the portable carrier on the table surface and depresses the handle 11. As the handle 11 moves down, the cam surfaces 19 and 20 force the cam follower slots 21 and 21a and the slidable jaw members 5 and 6 away from the fixed jaw members 4 and 7 into the released position shown in Fig. 2. At the same time, the bent latch member 22 cams over and automatically catches on the lipped holding member 25. The movable handle 11 is thereafter raised vertically and, since the bent latch member 22 remains engaged with lipped holding member 25, the entire portable carrier is raised vertical above the glasses while the jaw members remain in released position. The filled drinking glasses have thus been safely and accurately deposited upon the table top and the portable carrier is ready for another cycle of operation.

In accord with the objects thereof, our invention will thus be seen to provide a portable article carrier which utilizes cam actuated jaws to grip, carry, and release a multiplicity of articles simultaneously. Furthermore, the jaw members of our invention grip the glasses or bottles therebetween only about the periphery thereof and are detachably mounted to allow an interchange of various sized jaws to conform to various sized articles to be carried. The releasable latch means of our invention holds the slidable jaws thereof away from the fixed jaws in a released position when such is desired. Thus, the portable carrier may be lifted above the drinking glasses or bottles after these articles have been safely deposited on a table. We deem our invention to be of substantial utility in reducing the cost of doing business due to drinking glass and bottle breakage in restaurants, night clubs, hotels, and taverns.

We claim:

1. A portable article carrier for releasably gripping an article to be carried therein, comprising complementary movable and fixed article gripping jaws, a handle structure movable vertically and manually between a raised and a lowered position, cam and follower actuation means operatively connected to both said handle and said movable jaw to move the latter toward and away from said fixed jaw respectively to define a grip and a release position, said jaw grip and release positions corresponding respectively to said handle raised and lowered positions, and releasable latch means carried by said handle to latch said movable jaw in said release position when said handle is moved to said lowered position.

2. A portable article carrier for releasably gripping an article to be carried therein, comprising complementary movable and fixed article gripping jaws, a cam follower element formed in said movable jaw, cam actuation means for moving said cam follower element and said movable jaw toward and away from said fixed jaw to define respective grip and release positions, latch means operable to hold said movable jaw in said release position when said cam follower is moved to said release position, and plunger means for releasing said latch means hold to allow actuation of said movable jaw to said grip position.

3. A portable article carrier for releasably gripping an article to be carried therein, comprising an elongated peripheral frame carrying lateral guide means, complementary movable and fixed article gripping jaws, means detachably mounting said fixed jaw upon said peripheral frame, said movable jaw being slidably mounted upon said guide means for lateral movement thereover, and cam and follower actuation means for moving said movable jaw laterally over said guide means toward and away from said fixed jaw to grip and release an article to be carried.

4. A portable article carrier for releasably gripping an article to be carried therein, comprising an elongated peripheral frame carrying lateral guide means upon both ends thereof, complementary movable and fixed article gripping jaws, means including slotted riders for mounting said jaws slidably upon said lateral guide means, said fixed jaw being detachably secured to said frame with a friction grip fastener, a movable handle structure slidably mounted on said peripheral frame, and cam and follower actuation means connected to said movable handle for sliding said movable jaw over said lateral guide means toward and away from said fixed jaw, respectively, to define a grip and release position.

5. A portable carrier for releasably gripping a multiplicity of articles to be carried therein, comprising an elongated peripheral frame having lateral guide means on each end thereof, two pair of complementary gripping jaws operatively mounted on said peripheral frame, two of said jaws being detachably fixed to opposite marginal side portions of said frame and two of said jaws being slidably mounted therebetween upon said lateral guide means, and cam actuation means for simultaneously sliding each said slidable jaw laterally along said guide means toward and away from the fixed jaw complementary thereto.

6. A portable carrier for releasably gripping a multiplicity of articles to be carried therein, comprising a peripheral frame, two pair of complementary gripping jaws operatively mounted on said peripheral frame, two of said jaws being detachably fixed to opposite marginal portions of said frame and two of said jaws being slidably mounted therebetween, multiple cam follower elements formed in each said slidable jaw, and cam actuation means for simultaneously sliding each said cam follower element and each said slidable jaw toward and away from the fixed jaw complementary thereto.

7. A portable carrier for releasably gripping a multiplicity of articles to be carried therein, comprising a peripheral frame, two pair of complementary gripping jaws operatively mounted on said peripheral frame, two of said jaws being detachably fixed to opposite marginal portions of said frame and two of said jaws being slidably mounted therebetween, and a handle structure movable with respect to said peripheral frame and carrying pendent cam actuation means for simultaneously sliding each said slidable jaw toward and away from the fixed jaw complementary thereto.

8. A portable carrier for releasably gripping a multiplicity of articles to be carried therein, comprising a peripheral frame open at both the top and bottom, two pair of complementary gripping jaws operatively mounted on said peripheral frame, two of said jaws being detachably fixed to opposite marginal portions of said frame and two of said jaws being slidably mounted therebetween, and a handle structure movable with respect to said peripheral frame and carrying pendent cam actuation means for simultaneously sliding each said slidable jaw toward and away from the fixed jaw complementary thereto to respectively grip and release a multiplicity of articles located therebetween, and releasable latch means adjacent said handle structure for holding said two slidable jaws away from said two fixed jaws.

9. A portable carrier for releasably gripping a multiplicity of articles to be carried therein, comprising a peripheral frame, two pair of complementary gripping jaws operatively mounted on said peripheral frame, two of said jaws being fixed to opposite marginal portions of said frame and two of said jaws being slidably mounted therebetween, multiple cam follower elements formed in each said slidable jaw, and a handle structure movable with respect to said peripheral frame and carrying pendent cam actuation means for simultaneously sliding each said cam follower element and each said slidable jaw toward and away from the fixed jaw complementary thereto.

10. A portable carrier for releasably gripping a multiplicity of articles to be carried therein, comprising a peripheral frame, two pair of complementary gripping jaws operatively mounted on said peripheral frame, two of said jaws being detachably fixed to opposite marginal portions of said frame and two of said jaws being slidably mounted therebetween, multiple cam follower elements formed in each said slidable jaw, and a handle structure movable with respect to said peripheral frame and carrying pendent cam actuation means for simultaneously sliding each said cam follower element and each said slidable jaw toward and away from the fixed jaw complementary thereto to respectively grip and release a multiplicity of articles located therebetween, and releasable latch means adjacent said handle structure for holding said two slidable jaws away from said two fixed jaws.

CALVIN E. HUTCHISON.
     WILLIAM F. SPIVEY, Jr.

REFERENCES CITED

The following references are of record in the file of this patent:

UNITED STATES PATENTS

| Number | Name | Date |
| --- | --- | --- |
| 1,338,652 | Halvorsen | Apr. 27, 1920 |
| 2,007,064 | Shipley | July 2, 1935 |
| 2,140,314 | Doscher | Dec. 13, 1938 |
| 2,291,477 | Kolb et al. | July 28, 1942 |
| 2,520,203 | Haywa | Aug. 29, 1950 |